(12) United States Patent
Smits

(10) Patent No.: US 11,351,434 B2
(45) Date of Patent: Jun. 7, 2022

(54) POWER MEASUREMENT DEVICE

(71) Applicant: Tacx B.V., Wassenaar (NL)

(72) Inventor: Martin Smits, Wassenaar (NL)

(73) Assignee: Tacx B.V., Wassenaar (NL)

( * ) Notice: Subject to any disclaimer, the term of this patent is extended or adjusted under 35 U.S.C. 154(b) by 639 days.

(21) Appl. No.: 16/406,607

(22) Filed: May 8, 2019

(65) Prior Publication Data

US 2019/0346320 A1   Nov. 14, 2019

(30) Foreign Application Priority Data

May 8, 2018   (NL) ..................................... 2020892

(51) Int. Cl.
| | | |
|---|---|---|
| *A63B 69/16* | (2006.01) | |
| *A63B 22/06* | (2006.01) | |
| *A63B 24/00* | (2006.01) | |
| *G01L 3/24* | (2006.01) | |
| *B62J 45/20* | (2020.01) | |
| *B62J 43/30* | (2020.01) | |

(52) U.S. Cl.
CPC .......... *A63B 69/16* (2013.01); *A63B 22/0605* (2013.01); *A63B 24/0062* (2013.01); *B62J 43/30* (2020.02); *B62J 45/20* (2020.02); *G01L 3/242* (2013.01); *A63B 2069/165* (2013.01); *A63B 2220/40* (2013.01); *A63B 2220/833* (2013.01); *A63B 2225/02* (2013.01); *A63B 2225/52* (2013.01)

(58) Field of Classification Search
CPC . A63B 69/16; A63B 24/0062; A63B 2220/40; A63B 2220/833; A63B 2225/02; A63B 2225/52; A63B 2220/30; A63B 2220/35; A63B 2220/54; A63B 2220/62; A63B 2225/50; A63B 2220/44; G01L 3/26; G01L 3/242
See application file for complete search history.

(56) References Cited

U.S. PATENT DOCUMENTS

| | | | |
|---|---|---|---|
| 4,938,475 A | | 7/1990 | Sargeant et al. |
| 5,027,303 A | * | 6/1991 | Witte ...................... G01L 3/242 |
| | | | 482/901 |
| 5,890,995 A | | 4/1999 | Bobick et al. |
| 6,056,672 A | | 5/2000 | Carbonell Tendero |

(Continued)

FOREIGN PATENT DOCUMENTS

| | | |
|---|---|---|
| EP | 2319592 | 5/2011 |
| EP | 2818214 | 12/2014 |

(Continued)

OTHER PUBLICATIONS

"Track Simulation", http://www.cyclus2.com/en/track-simluation.htm, 1.

*Primary Examiner* — Francis C Gray
(74) *Attorney, Agent, or Firm* — Samuel M. Korte; Max M. Ali

(57) ABSTRACT

Power measurement device for a bicycle trainer, which device is built as a unitary relocatable device comprising an acceleration or velocity sensor, a microcontroller and a memory, wherein the device is equipped with or connectable to a power source, preferably a battery, and wherein the device is equipped with a communication facility to enable the device to wirelessly or through wires communicate with an external application device.

5 Claims, 1 Drawing Sheet

(56) References Cited

U.S. PATENT DOCUMENTS

| | | | |
|---|---|---|---|
| 7,326,151 B2 | 2/2008 | Peterson et al. | |
| 7,604,575 B2 | 10/2009 | Papadopoulos | |
| 7,942,790 B2 | 5/2011 | Papadopoulos | |
| 9,063,026 B2* | 6/2015 | Nassef | G01L 5/0095 |
| 9,182,304 B2* | 11/2015 | Namiki | G01L 5/225 |
| 9,295,894 B2 | 3/2016 | Papadopoulos | |
| 9,314,667 B2* | 4/2016 | Puerschel | A63B 21/225 |
| 9,381,396 B2 | 7/2016 | Colan et al. | |
| 10,112,098 B2 | 10/2018 | Smits | |
| 2005/0008992 A1 | 1/2005 | Westergaard et al. | |
| 2009/0120210 A1* | 5/2009 | Phillips | G01L 3/242 |
| | | | 73/862.338 |
| 2010/0050785 A1* | 3/2010 | Roessingh | B62J 45/42 |
| | | | 73/862.325 |
| 2010/0062908 A1 | 3/2010 | Hamilton | |
| 2011/0039664 A1 | 2/2011 | Cooper | |
| 2011/0172059 A1 | 7/2011 | Watterson et al. | |
| 2012/0322621 A1 | 12/2012 | Bingham, Jr. et al. | |
| 2013/0059698 A1 | 3/2013 | Barton | |
| 2014/0171266 A1 | 6/2014 | Hawkins, III et al. | |
| 2016/0015862 A1 | 6/2016 | Bauer et al. | |
| 2017/0216678 A1 | 8/2017 | Smits | |
| 2017/0216698 A1 | 8/2017 | Smits | |
| 2018/0099178 A1* | 4/2018 | Schaefer | A63B 22/0087 |

FOREIGN PATENT DOCUMENTS

| | | | | |
|---|---|---|---|---|
| ES | 2535582 A1 * | 5/2015 | | B62J 99/00 |
| FR | 2655862 | 6/1991 | | |
| NL | 1019154 | 4/2003 | | |
| NL | 2001323 | 8/2009 | | |
| WO | 89/01806 | 3/1989 | | |
| WO | 92/16267 | 10/1992 | | |
| WO | 2007/033254 | 3/2007 | | |
| WO | 2007/083341 | 7/2007 | | |
| WO | WO-2012056522 A1 * | 5/2012 | | B62J 99/00 |

* cited by examiner

POWER MEASUREMENT DEVICE

CROSS-REFERENCE TO RELATED APPLICATIONS

This application claims priority to Netherlands Patent Application No. 2020892, entitled "Power Measurement Device", filed on May 8, 2018, and the specifications and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

Embodiments of the present invention relate to a power measurement device for a bicycle and/or bicycle trainer.

Description of Related Art

Such a power measurement device is for instance known from US2012/0322621 and is tailored to a specific application which makes it complicated in design, and inflexible in its use.

It is an object of the invention to provide a low-cost power measurement device which can be easily used with very diverse bicycles and/or bicycle trainers which may have mutually different parameters in terms of friction, inertia and possibly other features that have an impact on the power that a person exercising on the bicycle and/or bicycle trainer may provide during a training session.

WO89/01806 discloses a power measurement device for a bicycle and/or bicycle trainer, comprising an acceleration or velocity sensor, a microcontroller and a memory, wherein the device is equipped with or connectable to a power source, and wherein the device is equipped with a communication facility to enable the device to wirelessly or through wires communicate with an external application device. The microcontroller and/or memory are provided with a computer program which is arranged to derive a power measurement at least from signals received from the acceleration or velocity sensor.

The power measurement device of WO89/01806 further takes account of a frictional force or torque that applies to a wheel of the bicycle and/or bicycle trainer on which the power measurement device is mounted, and is arranged to apply the frictional force or torque together with the signals received from the acceleration or velocity sensor to calculate the power supplied by a user during exercising with the bicycle or bicycle trainer.

BRIEF SUMMARY OF THE INVENTION

Embodiments of the power measurement device of the present invention comprise the features of one or more of the appended claims.

Essentially, embodiments of the power measurement device of the present invention comprise features such that
  the microcontroller and/or memory is provided with a calibration functionality to calibrate the power measurement as derived from the signals received from the acceleration or velocity sensor,
  the calibration functionality is arranged to derive a frictional force or torque that applies to the wheel of the bicycle and/or bicycle trainer on which the power measurement device is mounted from a measurement on the wheel of the bicycle and/or bicycle trainer, and
  the communication facility is equipped to receive parameters defining inertia and wheel diameter of the bicycle and/or bicycle trainer onto which the power measurement device is mounted, and
  the calibration functionality is arranged to apply these parameters regarding inertia and wheel diameter to derive from a measured run out time of the wheel the said frictional force or torque that applies to the wheel of the bicycle and/or bicycle trainer.

This makes the power measurement device of the invention easily transportable and applicable to various bicycles or bicycle trainers having diverse dimensions, wherein the power measurement device of the invention is nevertheless equipped to provide each time a reliable power measurement.

A preferable feature is that the power measurement device of the invention is built as a unitary relocatable device enabling it to be mounted on very different bicycles and/or bicycle trainers. It comprises an acceleration or velocity sensor, a microcontroller and a memory, wherein the device is equipped with or is connectable to a power source, preferably a battery. As mentioned, the device is equipped with a communication facility to enable the device to wirelessly or through wires communicate with an external application device. The application device is for instance a processor with a training program.

Suitably the calibration functionality is arranged to measure a run out time of a wheel of the bicycle and/or bicycle trainer onto which the power measurement device is mounted, wherein from a predetermined starting velocity of the wheel, said wheel is released to run down to a zero velocity while subjected to a predetermined load.

BRIEF DESCRIPTION OF THE SEVERAL VIEWS OF THE DRAWINGS

Embodiments of the present invention will hereinafter be further elucidated with reference to the drawing of an exemplary embodiment of an apparatus according to the invention that is not limiting as to the appended claims.

DETAILED DESCRIPTION OF THE INVENTION

Figure 1:
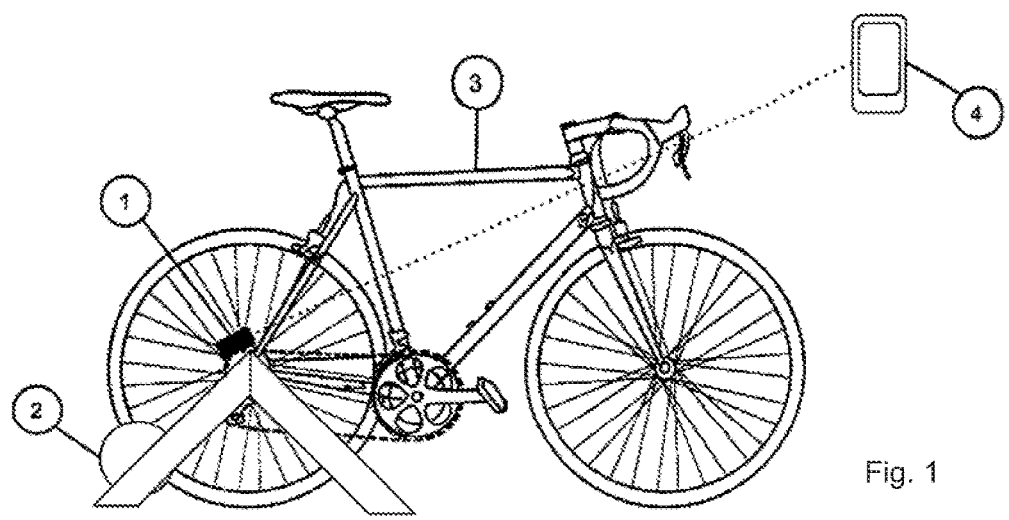
FIG. 1 shows a power measurement device according to an embodiment of the present invention as applied in a bicycle trainer configuration.

Whenever in the figures the same reference numerals are applied, these numerals refer to the same parts.

FIG. 1 depicts a known configuration of a bicycle trainer 2 that is driven by a back wheel of a bicycle 3. A power measurement device 1 according to an embodiment of the present invention is mounted on the back wheel of the bicycle 3 to derive a power measurement reading from a signal from an acceleration or velocity sensor that forms part of this power measurement device 1.

Figure 2:
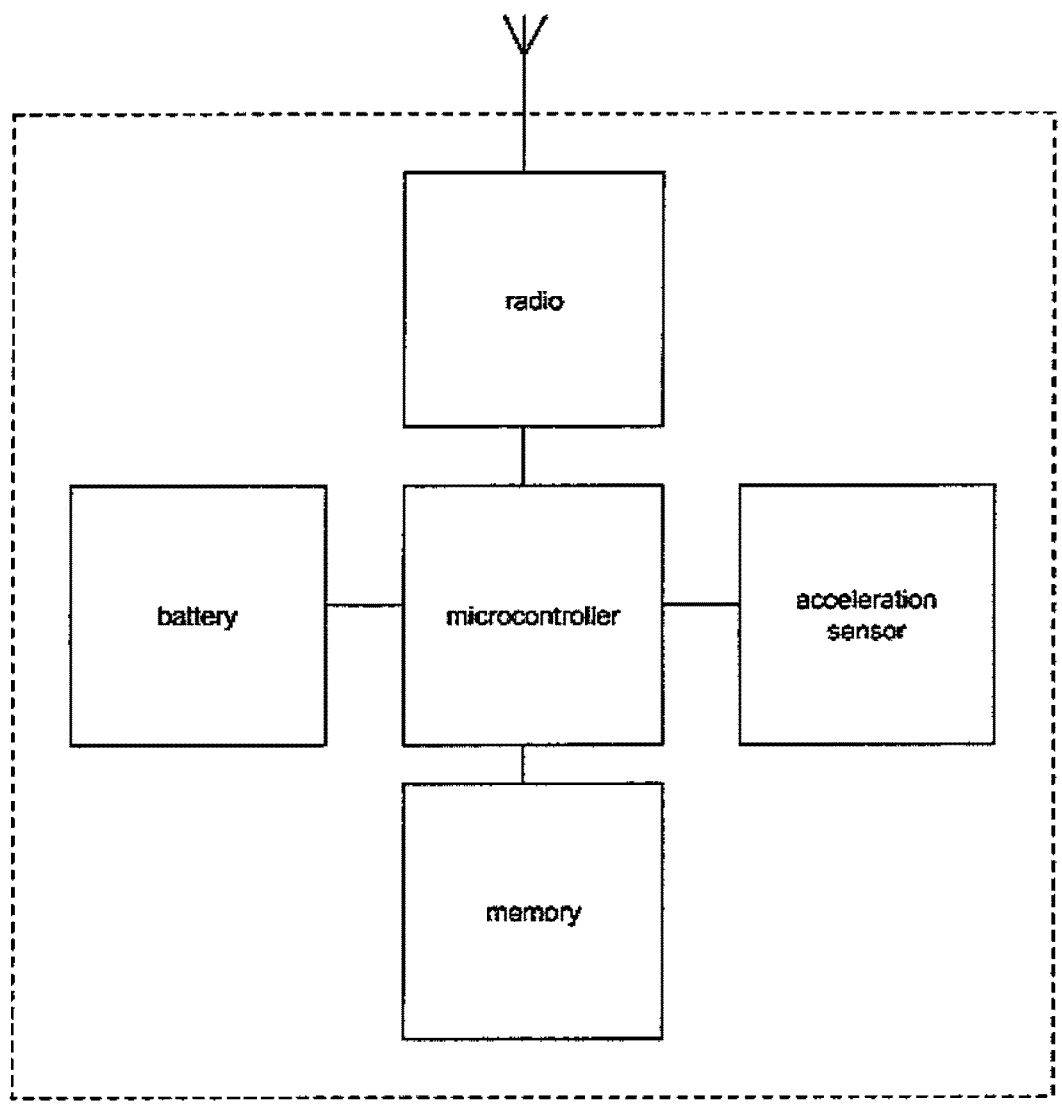
FIG. 2 shows a schematic drawing of a power measurement device according to an embodiment of the present invention.

FIG. 2 shows a schematic drawing of a power measurement device 1 according to an embodiment of the present invention which is built as a unitary relocatable device comprising an acceleration or velocity sensor 5, a microcontroller 6 and a memory 7, wherein the device 1 is equipped with or connectable to a power source 8, preferably a battery 8', and wherein the device 1 is equipped with a communication facility 9 to enable the device to wirelessly communicate with an external application device 4 as shown in FIG. 1. For completeness sake it is remarked that it is also possible to arrange for a wired communication between the device 1 and the external application device 4. The application device 4 is for instance a processor provided with a training program to be executed with the bicycle 3 and/or bicycle trainer 2.

According to an embodiment of the present invention the microcontroller 6 and/or memory 7 are provided with a computer program which is arranged to derive a power measurement from signals received from the acceleration or velocity sensor 5.

Preferably it is arranged that when loaded with the computer program the microcontroller 6 and/or memory 7 are used to execute a calibration functionality to calibrate the power measurement as derived from the signals received from the acceleration or velocity sensor 5. To this end it is preferred that the calibration functionality is arranged to measure a run out time of the back wheel of the bicycle 3 and/or bicycle trainer 2 onto which the power measurement device 1 is mounted, wherein from a predetermined starting velocity of the back wheel, said wheel is released to run down to a zero velocity while subjected to a predetermined load. The time it takes to arrive at zero velocity is then used to establish a frictional force or torque that applies to the back wheel of the bicycle 3 and/or bicycle trainer 2 onto which the power measurement device 1 is mounted. The power measurement device 1 is arranged to apply this frictional force or torque together with the signals received from the acceleration or velocity sensor 5 to calculate the power supplied by a user during exercising with the bicycle 3 and/or bicycle trainer 2.

The communication facility 9 of the power measurement device 1 of the invention is further equipped to receive parameters defining inertia and wheel diameter of the bicycle 3 and/or bicycle trainer 2 onto which the power measurement device 1 is mounted, wherein the calibration functionality is arranged to apply these parameters to derive from the run out time of the back wheel of the bicycle 3 the said frictional force or torque that applies to the back wheel of the bicycle 3 and/or bicycle trainer 2.

Although the invention has been discussed in the foregoing with reference to an exemplary embodiment of the power measurement device of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Embodiments of the present invention provide a technology-based solution that overcomes existing problems with the current state of the art in a technical way to satisfy an existing problem for cyclists. An embodiment of the present invention is necessarily rooted in computer technology in order to overcome a problem specifically arising in the realm of computers. Embodiments of the present invention achieve important benefits over the current state of the art, such as making power measurement devices easily transportable and functional with various bicycles and/or bicycle trainers.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A power measurement device for a bicycle and/or bicycle trainer comprising:
   an acceleration or velocity sensor;
   a microcontroller;
   a memory;
   wherein the power measurement device is equipped with or connectable to a power source, and
   wherein the power measurement device is equipped with a communication facility to enable the device to wirelessly or through wires communicate with an external application device,
   wherein the microcontroller and/or memory are provided with a computer program which is arranged to derive a power measurement from signals received from said acceleration or velocity sensor, and
   wherein the power measurement device is arranged to use a frictional force or torque that applies to a wheel of the bicycle and/or bicycle trainer on which the power measurement device is mounted together with the signals received from said acceleration or velocity sensor to calculate the power supplied by a user during exercising with the bicycle or bicycle trainer,
   wherein said microcontroller and/or said memory is provided with a calibration functionality to calibrate the power measurement as derived from the signals received from said acceleration or velocity sensor,
   wherein said calibration functionality is arranged to derive a frictional force or torque that applies to the wheel of the bicycle and/or bicycle trainer on which the power measurement device is mounted from a measurement on the wheel of the bicycle and/or bicycle trainer, and
   wherein said communication facility is equipped to receive parameters defining inertia and wheel diameter of the bicycle and/or bicycle trainer onto which the power measurement device is mounted, and
   wherein said calibration functionality is arranged to apply these parameters regarding inertia and wheel diameter to derive from a run out time of the wheel the said frictional force or torque that applies to the wheel of the bicycle and/or bicycle trainer.

2. The power measurement device according to claim 1, wherein the power measurement device is built as a unitary relocatable device.

3. The power measurement device according to claim 1, wherein said calibration functionality is arranged to measure a run out time of a wheel of the bicycle and/or bicycle trainer onto which the power measurement device is mounted, wherein from a predetermined starting velocity of the wheel, said wheel is released to run down to a zero velocity while subjected to a predetermined load.

4. The power measurement device according to claim 2, wherein said calibration functionality is arranged to measure a run out time of a wheel of the bicycle and/or bicycle trainer onto which the power measurement device is mounted, wherein from a predetermined starting velocity of the wheel, said wheel is released to run down to a zero velocity while subjected to a predetermined load.

5. The power measurement device according to claim 1, wherein said power source is a battery.

* * * * *